(12) United States Patent
Hunter

(10) Patent No.: US 7,254,828 B2
(45) Date of Patent: Aug. 7, 2007

(54) MULTIPLE INPUT DATA RECEIVER FOR CABLE TELEVISION SYSTEMS

(75) Inventor: David R. Hunter, Indianapolis, IN (US)

(73) Assignee: Acterna LLC, Germantown, MD (US)

( * ) Notice: Subject to any disclaimer, the term of this patent is extended or adjusted under 35 U.S.C. 154(b) by 877 days.

(21) Appl. No.: 09/874,842

(22) Filed: Jun. 5, 2001

(65) Prior Publication Data

US 2002/0199202 A1 Dec. 26, 2002

(51) Int. Cl.
*H04N 7/173* (2006.01)
*H04B 1/00* (2006.01)
*H04B 7/00* (2006.01)
*H04B 15/00* (2006.01)
*G06F 15/00* (2006.01)
*H03F 1/26* (2006.01)

(52) U.S. Cl. ............... 725/125; 455/63.1; 455/501; 702/191

(58) Field of Classification Search ........... 725/114, 725/121
See application file for complete search history.

(56) References Cited

U.S. PATENT DOCUMENTS

| 3,689,841 | A | * | 9/1972 | Bello et al. ............... 375/216 |
|---|---|---|---|---|
| 3,750,022 | A | * | 7/1973 | Curry et al. ............... 725/125 |
| 4,454,538 | A | | 6/1984 | Toriumi |
| 5,126,840 | A | * | 6/1992 | Dufresne et al. ........... 725/125 |
| 5,583,562 | A | * | 12/1996 | Birch et al. ............... 725/151 |
| 5,606,725 | A | * | 2/1997 | Hart ............................ 725/131 |
| 5,729,281 | A | * | 3/1998 | Utsumi et al. .............. 725/119 |
| 5,867,764 | A | | 2/1999 | Williams |
| 5,870,513 | A | | 2/1999 | Williams |
| 5,956,074 | A | | 9/1999 | Sclafani |
| 6,094,211 | A | * | 7/2000 | Baran et al. ................ 725/125 |
| H1858 | H | * | 9/2000 | Ibelings ...................... 725/121 |
| 6,215,514 | B1 | * | 4/2001 | Harris .......................... 725/74 |
| 6,425,132 | B1 | * | 7/2002 | Chappell .................... 725/107 |
| 6,868,552 | B1 | * | 3/2005 | Masuda et al. ............ 725/125 |

\* cited by examiner

*Primary Examiner*—John Miller
*Assistant Examiner*—Dominic Saltarelli
(74) *Attorney, Agent, or Firm*—Allen, Dyer, Doppelt, Milbrath & Gilchrist, P.A.

(57) ABSTRACT

A multiple input data receiver for bi-directional cable television (CATV) systems simultaneously monitors and selectively receives a return path signal on a plurality of return paths. When an appropriate data or signal transmission is detected on a return path, the corresponding return path is selected and then demodulated. The demodulated signal is appropriately decoded to yield signal data. Various tests and analyzing may be performed on the signal data. Simultaneous monitoring/receiving of all or a plurality of return paths minimizes system response time.

17 Claims, 4 Drawing Sheets

MULTIPLE INPUT DATA RECEIVER FOR CABLE TELEVISION SYSTEMS

FIELD OF THE INVENTION

The present invention relates to data receivers for bi-directional cable television systems and, more particularly, to a data receiver for monitoring signals on a plurality of return paths of bi-directional cable television systems.

DESCRIPTION OF THE PRIOR ART

Cable television systems, often denoted CATV systems, are comprised of many miles of coaxial cable strung about a service area with amplifiers and other elements interspersed throughout as necessary. The CATV system carries a number of channels of television programming that typically include both audio and video information. The CATV system may carry analog signals, digital signals, and/or a combination of analog and digital signals. As well, supplemental information, such as closed captioning information and/or V-chip (rating) information may also be broadcast over a channel, with each channel having a unique channel frequency. Subscribers to the CATV system are connected to the coaxial cable system, with the coaxial cable coupled to one or more televisions in the subscriber's home.

Such CATV systems typically include bi-directional communication path capability between a network head end and each remote point in the network. A network head end is typically the collection/origination point for forward path signals into the network and the collection/termination point for return path signals from the network. A collection point and a termination point may not necessarily be the same physical location in the network. Bi-directional CATV systems have become increasingly popular and supply customers with additional services, such as data communications and interactive videotext. To achieve bi-directional signal distribution, basic approaches can be employed.

One approach involves two-way communications over a single coaxial cable, with different frequency bands carrying signals in opposite directions. Another approach to obtain bi-directional signal distribution involves two-way communications over dual coaxial cables, with each cable carrying signals in one direction.

Two-way communications can be implemented on a single coaxial cable by dividing the available frequency spectrum on the cable into two bands. These bands carry signals in opposite directions, called forward or downstream (away from the head end) and return, reverse, or upstream (toward the head end). Devices attached to the network, such as cable boxes, transmit to the head end on the return band, and receive from the head end on the forward band. For example, a bi-directional communication path might include a first frequency range at or about 54-750 MHz for carrying signals in the forward path direction and a second frequency range at or about 5-40 MHz for carrying signals in the return path direction.

Two-way communications can also be implemented on two-way dual cable systems using two coaxial cables laid side-by-side. One cable provides the inbound (return) path signals to the head end. The second cable provides the outbound (forward) path signals from the head end to the attached devices.

In these bi-directional cable television systems, various methods have been used to monitor the return system for numerous signal problems and performance measures such as ingress, noise, cable box problems, and signal response. As well, normal signals on the return path from cable boxes, test meter telemetry and the like also preferably should be monitored for various reasons. In the past, when system problems arise, a service technician must go on-site to determine the source of the malfunction.

There is thus the need for a data receiver that can monitor, detect and receive data signals from multiple return paths in a cable television system. Currently, there are several popular ways to do this. One method is to combine all of the return paths. This is accomplished by providing a combiner on the input of the receiver. Combining all of the return paths, however, can result in unacceptable "noise funneling." Also, with this configuration, an input/path with ingress can jam and/or disable the other inputs/paths.

Another more widely utilized method involves a switch-scanning or scanning arrangement. In this configuration, there is a single detector with the inputs switched in sequence to the receiver. This method thus sequentially or orderly scans through the multiple inputs. A problem with this method is balancing out the "dwell" time on each input port with the speed of the detection hardware. Each of the filters in a receiver causes a delay in signal detection. If the demodulator is used to detect the presence of a signal, a long dwell on each port is needed to accommodate the filter delays. This sets an upper limit on the number of input ports that can be effectively monitored. Rapid scanning can also cause some signals to be missed.

It is easily discernable from the foregoing that previous known return path monitoring is deficient in various respects. Previous return path monitors do not continuously and/or simultaneously monitor all return paths of a bi-directional cable television system.

What is therefore needed is a data receiver for a bi-directional cable television system that is operative to substantially simultaneously monitor multiple return paths for return path signals.

What is further needed is a data receiver for a bi-directional cable television system that is operative to substantially simultaneously monitor multiple return paths for a return path signal and selectively receive a detected return path signal.

What is still further needed is a data receiver for a bi-directional cable television system that is operative to monitor multiple return paths for a return path signal, detect an appropriate return path signal, selectively receive the appropriate return path signal, and decode the received appropriate return path signal.

SUMMARY OF THE INVENTION

The present invention is a data receiver for bi-directional cable television systems that simultaneously monitors a plurality of return paths for detection of a return path signal. The data receiver is also operative to select and receive the detected signal on the particular return path.

Particularly, the present invention is a data receiver for bi-directional cable television systems that is operative to simultaneously monitor and receive a return path signal from multiple return paths.

More particularly, the present invention is a data receiver for bi-directional cable television systems that monitors multiple return paths in parallel to detect and then receive and decode an appropriate return path signal. The data receiver monitors N different RF input ports tuned to a common frequency by a single local oscillator that is split N ways. The input signals are mixed into individual IF circuits. A level detector for each IF circuit is used to determine if a signal above a specific level is being received. A duration detector is coupled to each level detector to determine if the signal level is maintained for a minimum duration. These two detection stages reduce the likelihood of false detection due to noise bursts and other random signals.

When a signal/data is detected, a signal detect notification is generated. This causes path select logic to route the appropriate IF circuit (signal) to a demodulator via an N:1 switch. The path select logic controls the N:1 switch from the individual signal detect lines. In the event that two or more signal detect lines occur simultaneously, the path select logic provides the arbitration to select only a single IF circuit. The controller also has the ability to disable a particular signal detect line in the path select logic if it is set inactive by a user or is too noisy. The controller also monitors the signal detect lines.

The demodulator decodes the data transmission and provides demodulated data to the controller. The demodulator provides a valid data signal to the controller. If a signal detect occurs and demodulated data is invalid, the controller can reset the path select logic to allow for monitoring of all return paths again. The valid data signal can also be used to indicate when a transmission (signal) has ended prematurely.

The threshold for the level detectors needs to be set to a sufficient level above a noise floor to prevent false detection. The threshold level for detection of a signal sets a minimum signal-to-noise limit for signal detection. The minimum signal to noise limit is set to be at or below the minimum signal-to-noise ratio (SNR) required for reliable data communications.

It is appreciated that the present invention works for any fixed level data modulation schemes. By choosing an appropriate demodulator, any number of data signals can be received. In a multi-mode demodulator version, each port is configured for a different modulation scheme. For example, two ports could be configured for FSK, three ports for QPSK, one port for BPSK, etc. By using signal detect lines to inform the controller of the data receiver which port is active, the controller can appropriately configure or setup the demodulator. As an alternative, an "auto-sensing" demodulator can be used to automatically detect different modulation types/schemes and then decode them appropriately.

In one form, the present invention is a data receiver for a bi-directional cable television system. The data receiver includes a plurality of input ports, signal conditioning circuitry, determination circuitry, and selection circuitry. The plurality of input ports are operative to be coupled to a separate return path of the bi-directional cable television system. The signal conditioning circuitry is in communication with the input ports and is operative to separately and substantially simultaneously receive and condition any signal on any of the input ports. The determination circuitry is in communication with the signal conditioning circuitry and is operative to separately and substantially simultaneously determine whether any signal is a receivable signal. The selection circuitry is in communication with the determination circuitry and is operative to select an input port of the plurality of input ports that carries a receivable signal and to output the receivable signal.

In another form, the present invention is a data receiver for a bi-directional cable television system. The data receiver includes a plurality of data receiver inputs, with each data receiver input operative to be coupled to a separate return path of the bi-directional cable television system. A local oscillator is provided that is operative to provide a fixed frequency signal. A mixer is coupled to each data receiver input with each mixer in communication with the local oscillator and operative to combine the fixed frequency signal with a signal on a respective data receiver input. A level detector is in communication with each mixer and is operative to determine if the combined signal reaches a predetermined threshold level. A duration detector is in communication with each level detector and is operative to determine if the combined signal lasts for a predetermined length of time. A switch is provided having a plurality of inputs each of which is coupled to one of the mixers. Each input of the selector is selectable for output of the combined signal thereon. The data receiver further includes selection logic operative to cause the switch to select for output the combined signal on the selected input.

In yet another form, the present invention is a method of monitoring a plurality of return paths in a bi-directional cable television system. The method includes: (a) coupling each one of a plurality of inputs of a data receiver to a separate return path of the bi-directional cable television system; (b) simultaneously determining for each input whether a receivable signal is present; (c) selecting the input corresponding to the return path carrying the receivable signal when it is determined that the input has a receivable signal; and (d) processing the selected receivable signal.

The present invention solves various problems of the prior art by providing substantially parallel detection of received signals from multiple input ports/paths without combining the signals. Thus, there is no interaction between the input ports, so a port cannot block another port. A signal on one of the ports or return paths is quickly selected for demodulation by using detection circuitry on the IF and decoding logic.

Also, since scanning is not necessary in the present invention, the present invention may be scaled up to any number of inputs, with no reduction in response time. Additionally, any input port or path may be shut off as necessary such as due to ingress or other unwanted signal or response. The present invention provides a means to quickly re-enable the monitoring of the input ports in the event that a false detection occurs. Simultaneous or parallel monitoring/receiving of all return paths minimizes system response time.

The present invention, however, works best for fixed carrier level data signals such as FSK (Frequency-Shift Keying), PSK (Phase-Shift Keying), BPSK (BiPhase-Shift Keying) and QPSK (Quadrature Phase-Shift Keying). Thus, signals that have varying amplitudes such as ASK (Amplitude-Shift Keying) and QAM (Quadrature Amplitude Modulation) require a variation in the detection of a signal from the multiple inputs, but not the general configuration nor the general operation of the present data receiver.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views.

DETAILED DESCRIPTION

Figure 1:
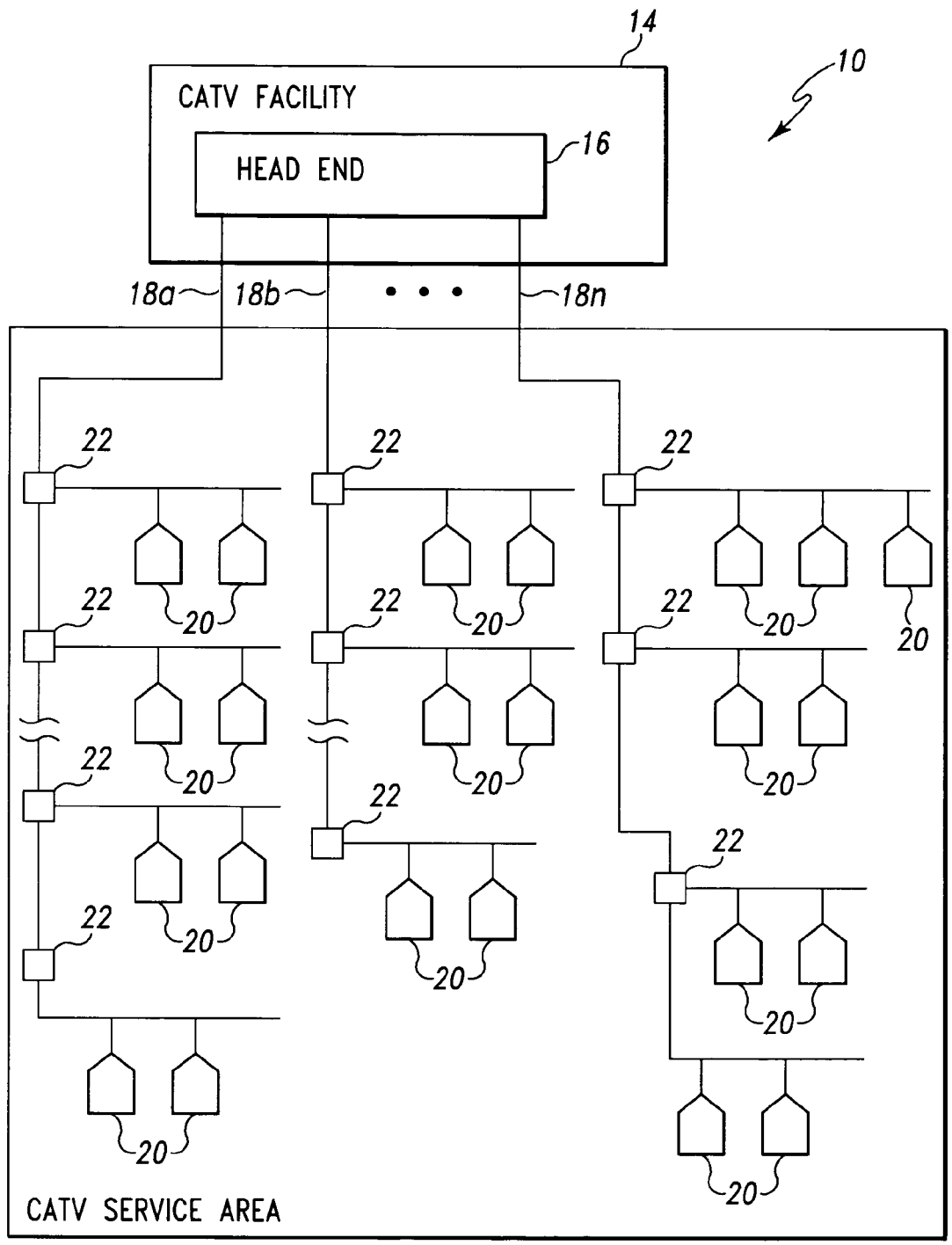
FIG. 1 is a diagrammatic representation of a bi-directional CATV system of the type in which the present invention may be used.

With reference now to FIG. 1, there is depicted a block diagram representation of a typical bi-directional television signal and data distribution system or network, generally designated 10. The bi-directional television signal and data distribution system 10 represents any same or similar bi-directional system anywhere in the world. Particularly, the bi-directional television signal and data distribution system 10 represents a bi-directional cable television (CATV) system that distributes, sends, or transmits television, data and/or entertainment signals (collectively, upstream originated signals) via a plurality of loops or runs of coaxial cable, fiber-optic cable, hybrid coaxial-fiber cable, and/or the like (collectively, coaxial cable) and receives data/signals (collectively, downstream originated signals) via the same coaxial cable or via a separate coaxial cable paralleling the upstream originated signal coaxial cable. Hereinafter, without limitation, the bi-directional television signal distribution system 10 will be referred to as a bi-directional CATV system 10. The upstream originated signals are within a particular frequency range, while the downstream originated signals are within a different particular frequency range. Thus, the upstream and downstream originated signals may be differentiated from one another by the frequency of the signal. The upstream originated signals may be considered as a forward path while the downstream originated signals may be considered as a return path.

The bi-directional CATV system 10 may provide one or more television channels or signals that are digital (i.e. digital television or digital signal) typically from a plurality of television channels or signals each of a particular frequency (hereinafter collectively, without limitation, channel). The digital modulation scheme for the digital channel may be any one of various types of digital modulation schemes such as Vestigal SideBand (VSB) or Quadrature Amplitude Modulation (QAM) and their variations (e.g. 4-VSB, 8-VSB, 16-QAM, and 32-QAM). The digital channel may include other type(s) of digital encoding as appropriate. The bi-directional CATV system 10 may provide all television channels in digital form. The bi-directional CATV system 10 may also include analog and/or a combination of analog and digital television channels. As well, the bi-directional CATV system 10 is operative to provide other services such as interactive television, cable modem, and the like (collectively television signals).

The bi-directional CATV system 10 includes a cable head end facility 14 at which a head end 16 of the bi-directional CATV system 10 is located. A plurality of coaxial cables 18a, 18b through 18n (collectively, coaxial cables 18) extend from the head end 16 throughout the area served by the cable system 10. Of course as indicated above, transmission lines or conduits other than coaxial cable may be used and are thus encompassed herein under the term "coaxial cable." Each coaxial cable 18a-18n forms a run or path for the various signals carried thereby. As shown in FIG. 1, the coaxial cables 18 are bi-directional, i.e. they carry both forward and return path signals/data. It should be appreciated that the coaxial cables 18 also represent two coaxial cables each in the case of a discrete two-path system (i.e. one coaxial cable 18a represents two coaxial cables, one for a forward path and one for a return path if a discrete path cable system is used).

Subscribers 20 are connected to the coaxial cables 18 at multiple points along its run. Interspersed throughout the run of coaxial cables 18 are various elements as are known in the art, such as amplifiers 22, which are part of the cable system 10. The subscribers 20 receive the upstream originated signals via the forward path of the coaxial cables 18.

As is conventional, the head end 16 receives a plurality of television signals, such as from satellite receivers (not shown) and antennas (not shown) located at the head end facility 14. The head end facility 14 converts the plurality of television signals to appropriate frequencies for transmission over the coaxial cables 18 to the subscribers 20. As an example, the cable system 10 might be designed to handle forty channels, each of which has a unique frequency or frequency range (bandwidth) carrying audio and video information. Other information may be carried by the television signal.

The television signals transmitted by the head end 16 generally consist of analog, digital, or a combination of analog and digital audio and video signals. In the case of digital television signals, of which the present invention is concerned, the digital audio and video bitstreams are converted into analog signals for transmission over the coaxial cables 18. This is accomplished by applying a modulation scheme representing the audio and video bitstreams onto a radio frequency (RF) carrier. The audio and video television bitstreams are assembled or encoded utilizing a digital codec (code/decode) protocol such as MPEG. Modulation schemes, for example, may be quadrature amplitude modulation (QAM), quadrature/quaternary phase shift keying (QPSK), or vestigal sideband (VSB). Other types of digital modulation schemes may also be used as well as variations of the above-mentioned digital modulation schemes (e.g. 16-QAM, 32-QAM, 64-QAM, 256-QAM, 4-VSB, and 8-VSB). As well, different digital modulation schemes may be used for different channels of the CATV system depending on the type of data being transmitted. Depending on the geographic area of the CATV system 10, the television signals are also formatted for the particular television standard (i.e. NTSC, PAL, SECAM).

Some of the subscribers 20 may have a cable box or other similar device (not shown) that is connected to the coaxial cables 18 and provides an interface between the head end 16 and a device that utilizes television signals such as a television, VTR, and/or the like (not shown). The cable box or like device is operative to generate and transmit or send signals to the head end 16 via the coaxial cables 18. The cable box generates and sends the downstream originated signals on the return path of the coaxial cables 18 to the head end 16. The downstream originated signals are typically data signals generated in response to a user action such as ordering a pay-per-view movie.

While not shown, it should be appreciated that a test meter (not shown) that utilizes telemetry with the head end 16 may be coupled to any point in the coaxial cables 18 in order to conduct tests on the CATV system 10. The test meter receives upstream originated signals from the head end and generates downstream originated signals that are received by the head end 16.

Figure 2:
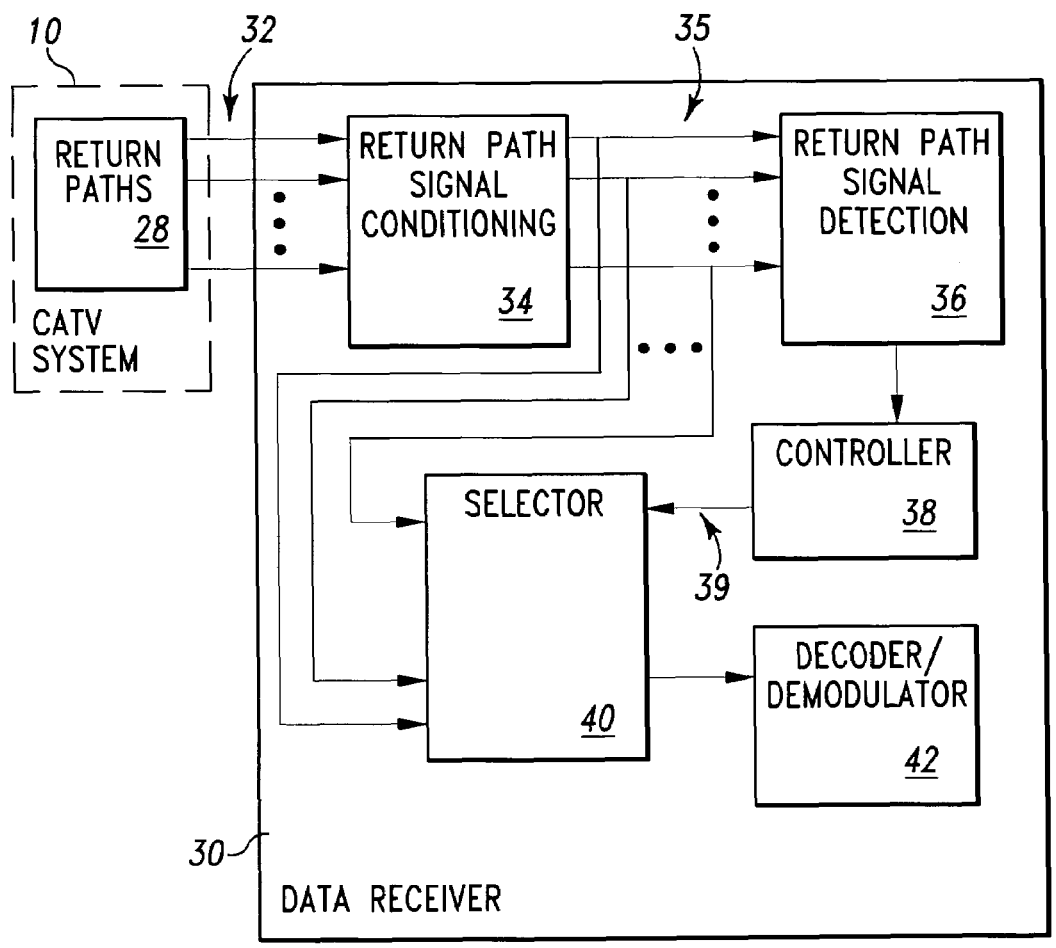
FIG. 2 is a simplistic block diagram illustrating an exemplary implementation of a data receiver in accordance with the principles presented herein.

Referring to FIG. 2, there is depicted a data receiver 30 in accordance with the principles presented herein. In general, the data receiver 30 is operative to simultaneously monitor (monitor in parallel) a plurality of return paths of the CATV system 10, simultaneously detect (detect in parallel) any appropriate downstream originated signal/data on any return path, select the appropriate downstream originated signal/data, and decode/demodulate the selected signal/data. This is accomplished generally by a plurality of return path inputs 32, return path signal conditioning 34, return path signal detection 36, controller 38, selector 40 and decoder/demodulator 42. The return path signal conditioning 34 has an input for each return path input 32 and an output 35 corresponding to each input 32. The return path signal detection 36 has an input for each output 35 of the return path signal conditioning 34 such that any signals are conditioned in parallel or simultaneously. The selector 40 has an input for each output 35 of the return path signal conditioning. Thus, selection of an input (signal) from the plurality of inputs (signals) also occurs in parallel or simultaneously. Once an appropriate signal has been detected on any return path, that signal is selected via the selector 40 under control by the controller 38 for decoding and/or demodulating by the decoder/demodulator 42. The signal thereafter may be further processed as desired.

More particularly, the data receiver 30 includes a plurality of inputs or ports 32 each of which is configured/adapted to be coupled to a return path of the plurality of return paths 28 of the CATV system 10 so as to receive any downstream originated signal/data from the CATV service area. Typically the data receiver 30 would reside at the CATV facility 14 in order to monitor the plurality of return paths. The return path signal conditioning circuitry/logic section or portion 34 is coupled to each input 32 (or vice versa) such that each input or return path (return path signal) is received and conditioned in parallel or substantially simultaneous with every other return path input/signal. Particularly, any signal/data received on any return path 28 (and in turn on a respective one of the inputs 32) is conditioned for detection, with such conditioning occurring in parallel.

The return path signal conditioning section 34 has a plurality of outputs 35 corresponding to one output for each return path input. The return path signal detection circuitry/logic section or portion 36 is coupled to each output 35 so as to receive each conditioned signal. The return path signal detection section 36 performs signal detection on each output/output signal in parallel with every other output/output signal from the return path signal conditioning section 34. The return path signal detection section 36 includes an output 37 that is input to the controller circuitry/logic section or portion 38. The return path signal detection section 36 provides detection of an appropriate signal (as opposed to noise and other undesirable signals/data) for any one of the return paths and the generation of a detection signal. The detection signal is input to the controller 38 such that the controller may provide a signal via output 39 to a selector 40 to indicate to the selector 40 which return path (output 35) has an appropriate return path signal.

Each output 35 is also coupled to the selector 40 such that when the controller 38 provides the signal to the selector 40, the selector 40 provides the signal on the particular return path to a decoder/demodulator circuitry/logic section or portion 42. The decoder/demodulator section 42 is operative to decode and/or demodulate the particular selected return path signal. The decoded and/or demodulated signal may then be analyzed by the data receiver 30 or may be provided at/as an n output for use by another device. Other information/data may be obtained and/or used as well.

Figure 3:
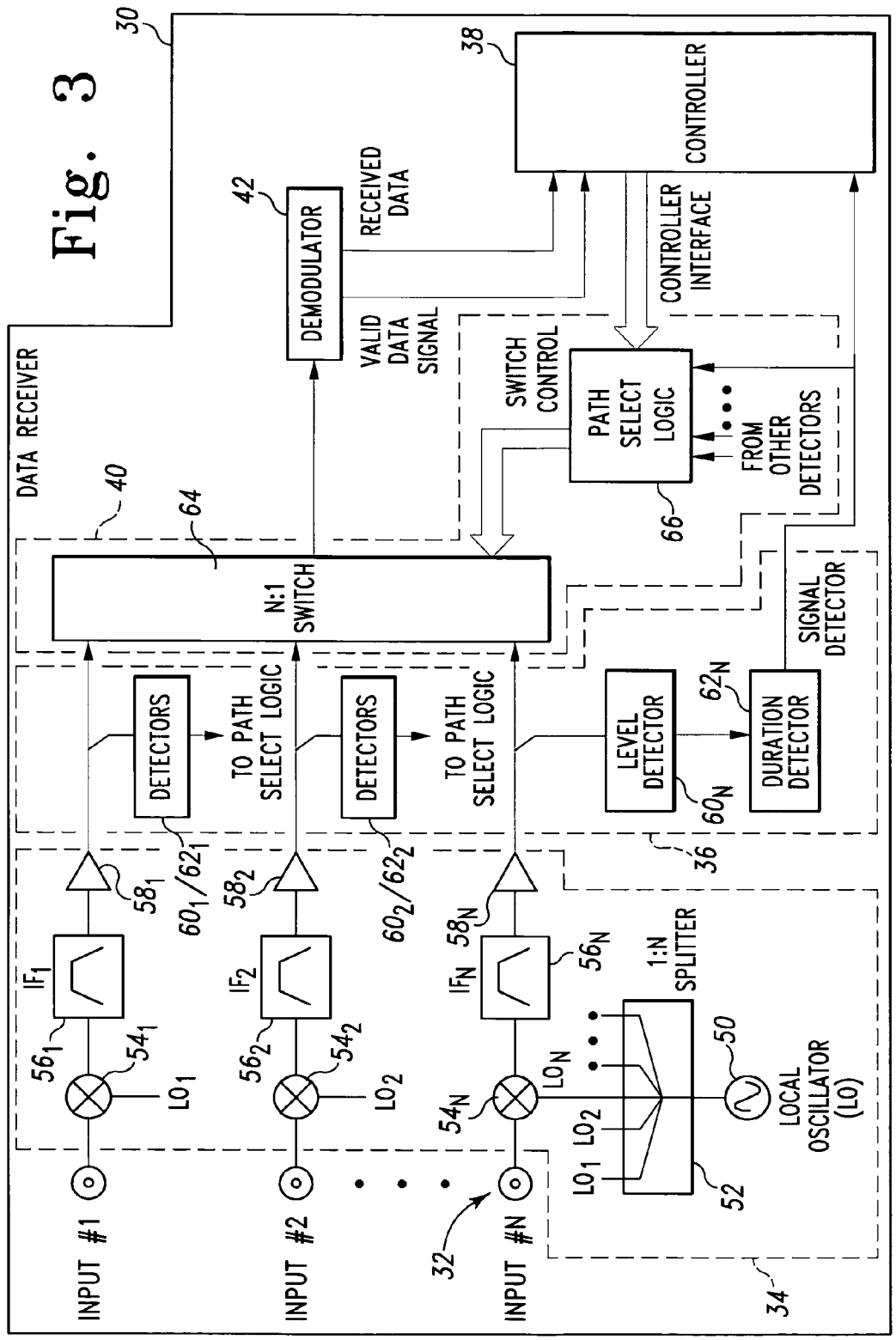
FIG. 3 is a more detailed block diagram representation of an exemplary data receiver in accordance with the principles presented herein.

Referring now to FIG. 3, there is shown a detailed block diagram of an exemplary data receiver 30. The plurality of inputs 32 are labeled INPUT #1 through INPUT #N to represent that the data receive 30 may have as many inputs as necessary to monitor as many return paths as necessary or desired. The signal conditioning section 34 includes a local oscillator 50 providing a signal of a particular frequency, and a one to N (1:N) splitter 52, where N is equal to #N (i.e. the oscillator signal is split by the number of inputs 32). The oscillator signal is mixed with each return path signal via a respective mixer $54_1$, $54_2$, through $54_N$ in order to obtain a tuned signal. The frequency of the local oscillator 50 is determined by a desired receive frequency. The return path signals are generally of a known frequency since such return path signals generally consist of telemetry data/signals, cable box data/signals, cable modem data/signals and the like. The frequency of the local oscillator is thus chosen to mix with the return path signal to provide a tuned signal of a particular frequency.

The output (tuned signal) of each mixer $54_1$, $54_2$, through $54_N$ is input to a respective bandpass or similar filter $56_1$, $56_2$, through $56_N$ ($IF_1$, $IF_2$, through $IF_N$) to obtain a filtered signal. Each filter $56_1$, $56_2$, through $56_N$ preferably has a 10 MHz bandwidth, but other values may suffice. The output of each filter $56_1$, $56_2$, through $56_N$ (filtered signal) is input to a respective buffer/amplifier $58_1$, $58_2$, through $58_N$. The output of each buffer/amplifier $58_1$, $58_2$, through $58_N$ is input to an N:1 switch 64, where N is equal to the number of INPUTS 32. The N:1 switch 64, upon appropriate command, will output a selected signal (an input port of the N:1 switch 64 will be selected). As well, the output of each buffer/amplifier $58_1$, $58_2$, through $58_N$ is input into a respective detector $60_1/62_1$, $60_2/62_2$, through $60_N/62_N$ each consisting of a level detector $60_X$ and a duration detector $62_X$. Since each detector $60_X/62_X$ are the same, reference will now be made to the detector $60_N/62_N$.

The level detector $60_N$ consists of appropriate circuitry/logic to determine whether the signal on that line reaches a particular threshold level. The level detector $60_N$ is thus configured for a particular minimum threshold level that the signal must meet or exceed. If the signal meets the threshold level, a signal is output by the level detector $60_N$. The signal may be the return path signal or may be a threshold level signal. In any case, the threshold level signal is input to a duration detector $62_N$. The duration detector $62_N$ consists of appropriate circuitry/logic to determine whether the signal lasts for a predetermined period of time or duration. The duration detector $62_N$ determines whether the level threshold was exceeded for a sufficient length of time and provides a signal detect signal. This helps prevent false signal detection due to noise bursts and other spurious signals.

The signal detect signal is input to the controller 38 and to path select logic 66. The path select logic 66 configures the N:1 switch 64 to the appropriate port/input (return path), while the controller 38 provides a signal to the path select logic 66 for control thereof. The signal/port selected by the N:1 switch 64 is then input to the demodulator/decoder 42 for recovery of the data on the return path signal, or decoding/demodulating the signal for further processing. The demodulator 42 is in communication with the controller 38 in order to send received/recovered data from the selected signal and to provide a valid data signal. The valid data signal is used to inform the controller 38 when a signal is received and/or indicated when the signal is lost, stopped, or a false signal was detected. In this case, the controller 38 can then reset the path select logic.

Additionally, the controller 38 can disable one or more signal detect lines in the path select logic 66 if desired or necessary. As well, the signal detect can be used to "interrupt" the controller 38 if desired or necessary.

Figure 4:
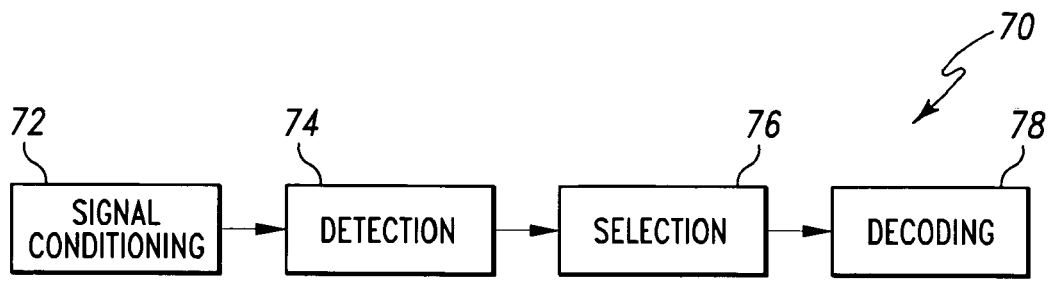
FIG. 4 is a flow diagram of an exemplary manner of operation of a data receiver in accordance with the principles presented herein.

Referring to FIG. 4, there is depicted a flow chart, generally designated 70, illustrating an exemplary top level manner in which the present data receiver operates in accordance with the principles presented herein. In step 72, all received signals are processed or conditioned appropriately. Thereafter, in step 74, the appropriately processed signals are passed through threshold detectors to determine if the signal "qualifies" as a "receivable" signal. After detection of a receivable signal, in step 76, the particular line carrying the receivable signal is selected. In step 78, the selected signal is then decoded and/or demodulated.

Figure 5:
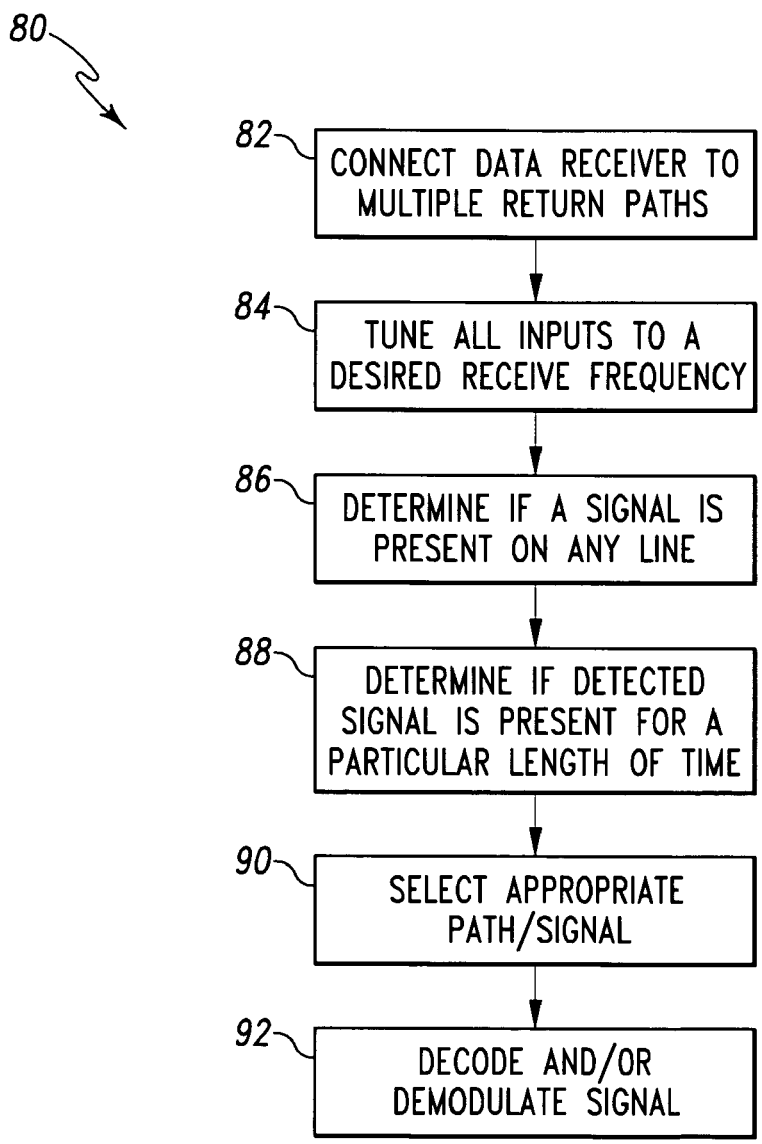
FIG. 5 is a flow diagram of another exemplary manner of operation of a data receiver in accordance with the principles presented herein.

Referring to FIG. 5, there is depicted a flow chart, generally designated 80, that illustrates another exemplary manner of operation of the data receiver 30. In step 82, each input of the data receiver 30 is coupled to a return path of the CATV system 10. In step 84, each input (signal) is then tuned to a desired receiving frequency. Preferably, the receiving frequency is the same for each signal/input. Thereafter, in step 86, it is determined whether a signal is present on any of the inputs/return paths. Preferably, this determination involves determining whether a signal passes a threshold level (such as amplitude) in order to "qualify" as a receivable signal. If the signal is determined not to be a receivable signal, no further processing of that signal is accomplished. If the signal is determined to be a receivable, the signal undergoes more processing. In step 88, it is determined whether the receivable signal is present for a particular length of time (duration) to further "qualify" the receivable signal as a desired signal. If the signal does not last for the predetermined duration, no further processing is performed on that signal. If the signal does last for the predetermined duration, the signal undergoes further processing. In step 90, the return path or input on which the signal was detected is selected. Thereafter, in step 92, the selected signal is then decoded and/or demodulated.

It should be appreciated that the manners of operation discussed above are applied to each signal simultaneously or in parallel with the exception of the decoding/demodulation of the signal.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A data receiver for parallel monitoring of a plurality of return paths in a bi-directional cable television system, the data receiver comprising:

a plurality of input ports operative to be coupled to the plurality of return paths;

a plurality of signal conditioning circuits, each signal conditioning circuit in communication with a respective one of said input ports and operative to separately and substantially simultaneously receive and condition any signal on said respective input port;

a plurality of determination circuits, each determination circuit in communication with a respective one of said signal conditioning circuits and operative to separately and substantially simultaneously determine whether any signal is a receivable signal; and selection circuitry in communication with each of said determination circuits and operative to select only one input port of said plurality of input ports that carries a receivable signal based on the determinations of the determination circuits, and to output the receivable signal;

wherein said selection circuitry comprises:

a switch having a plurality of inputs corresponding in number to said plurality of input ports and operative to output a signal carried by a selected input;

path select logic in communication with said switch and each of said determination circuits, and operative to cause said switch to select only one input of said plurality of inputs based on the determinations of the determination circuits; and a controller in communication with said path select logic and each of said determination circuits for receiving a signal detect signal from the determination circuit, which determines that a signal is a receivable signal, and accordingly controlling the path select logic, so as to select the input corresponding to the signal detect signal.

2. The data receiver of claim 1, further comprising:

a decoder in communication with said selection circuitry and operative to recover data from the receivable signal, and to provide a valid data signal upon detecting valid recovered data.

3. The data receiver of claim 1, wherein each of said signal conditioning circuits comprises:

a local oscillator providing a tuning signal of a predetermined frequency;

a mixer for each input port, each mixer being in communication with the local oscillator and operative to combine the tuning signal with any signal on the particular input port; and a bandpass filter for each mixer operative to pass a particular range of frequencies.

4. The data receiver of claim 1, wherein each of said determination circuits comprises:

a threshold detector for each input port and operative to determine whether any signal carried by the respective input port reaches a threshold level; and a duration detector for each threshold detector and operative to determine if any signal carried by the respective input port last a predetermined time period.

5. The data receiver of claim 1, further comprising a demodulator in communication with said selection circuitry and operative to demodulate the receivable signal.

6. The data receiver of claim 5, wherein the data receiver is operative on fixed carrier level data signals.

7. The data receiver of claim 5, wherein said demodulator a multimode demodulator configurable to selectively decode any one of FSK, PSK, BPSK, and QPSK.

8. A data receiver for parallel monitoring of a plurality of return paths in a bi-directional cable television system, the data receiver comprising:

a plurality of data receiver inputs, each data receiver input operative to be coupled separately to one of the plurality of return paths;

a local oscillator operative to provide a fixed frequency signal;

a plurality of mixers, each of said mixers coupled to a respective one of said data receiver inputs, each mixer in communication with said local oscillator and operative to combine the fixed frequency signal with a signal on the respective one of the data receiver inputs;

a plurality of level detectors, each level detector in communication with a respective one of said mixers and operative to determine if the combined signal reaches a predetermined threshold level;

a plurality of duration detectors, each duration detector in communication with a respective one of said level detectors and operative to determine if the combined signal lasts for a predetermined length of time;

a switch having a plurality of inputs each of which is coupled to one of the mixers, each input of which is selectable for output of the combined signal thereon;

path select logic, in communication with each of said duration detectors and each of said level detectors, operative to cause said switch to select for output the combined signal on only one selected input based on the determinations of the level and duration detectors; and a controller in communication with each of said duration detectors and said path select logic;

wherein said controller controls the path select logic according to a signal detect signal, which is based on whether the combined signal reaches the predetermined threshold level and whether the combined signal lasts for a predetermined length of time, received from one of the duration detectors.

9. The data receiver of claim 8, further comprising:
a decoder in communication with said switch and operative to decode the selected combined signal and to provide a valid data signal upon detecting valid decoded data.

10. The data receiver of claim 8, further comprising:
a band-pass filter in communication with each mixer; and
a buffer/amplifier in communication with each said filter.

11. A data receiver for parallel monitoring of a plurality of return paths in a bi-directional cable television system, the data receiver comprising:

a plurality of data receiver inputs, each data receiver input operative to be coupled separately to one of the plurality of return paths;

a local oscillator operative to provide a fixed frequency signal;

a plurality of mixers, each mixer coupled to a respective one of said data receiver inputs, each mixer in communication with said local oscillator and operative to combine the fixed frequency signal with a signal on a respective data receiver input;

a plurality of level detectors, each level detector in communication with a respective one of said mixers, and operative to determine if the combined signal reaches a predetermined threshold level;

a plurality of duration detectors, each duration detector in communication with a respective one of said level detectors and operative to determine if the combined signal lasts for a predetermined length of time;

a switch having a plurality of inputs each of which is coupled to one of the mixers, each input of which is selectable for output of the combined signal thereon; and path select logic, in communication with said plurality of duration detectors and said plurality of level detectors, operative to cause said switch to select for output the combined signal on only one selected input, based on whether the combined signal lasts for a predetermined length of time and whether the combined signal reaches a predetermined threshold level;

wherein each said threshold detector and duration detector is set to reject noise.

12. A method of parallel monitoring of a plurality of return paths of a bi-directional cable television system comprising:

coupling each one of a plurality of inputs of a data receiver to a separate return path of the bi-directional cable television system;

simultaneously determining for each input whether a receivable signal is present;

selecting only one input corresponding to the return path carrying the receivable signal when it is determined that the input has a receivable signal; and processing the selected receivable signal.

13. The method of claim 12, further comprising the step of separately conditioning each signal that is present on an input prior to the determining step.

14. The method of claim 13 wherein the conditioning step comprises the steps of:
tuning each signal to a particular frequency; and
band-pass filtering each tuned signal.

15. The method of claim 12, wherein the determining step comprises the steps of:
determining whether the receivable signal reaches a predetermined threshold level; and
determining, if the receivable signal reaches the predetermined threshold level, whether the receivable signal is present for a predetermined duration.

16. The method of claim 12, wherein the processing step comprises decoding the selected receivable signal and recovering data from the receivable signal.

17. The method of claim 16, wherein the processing step further comprises providing a valid data signal upon detecting valid recovered data.

* * * * *